Figure 1:
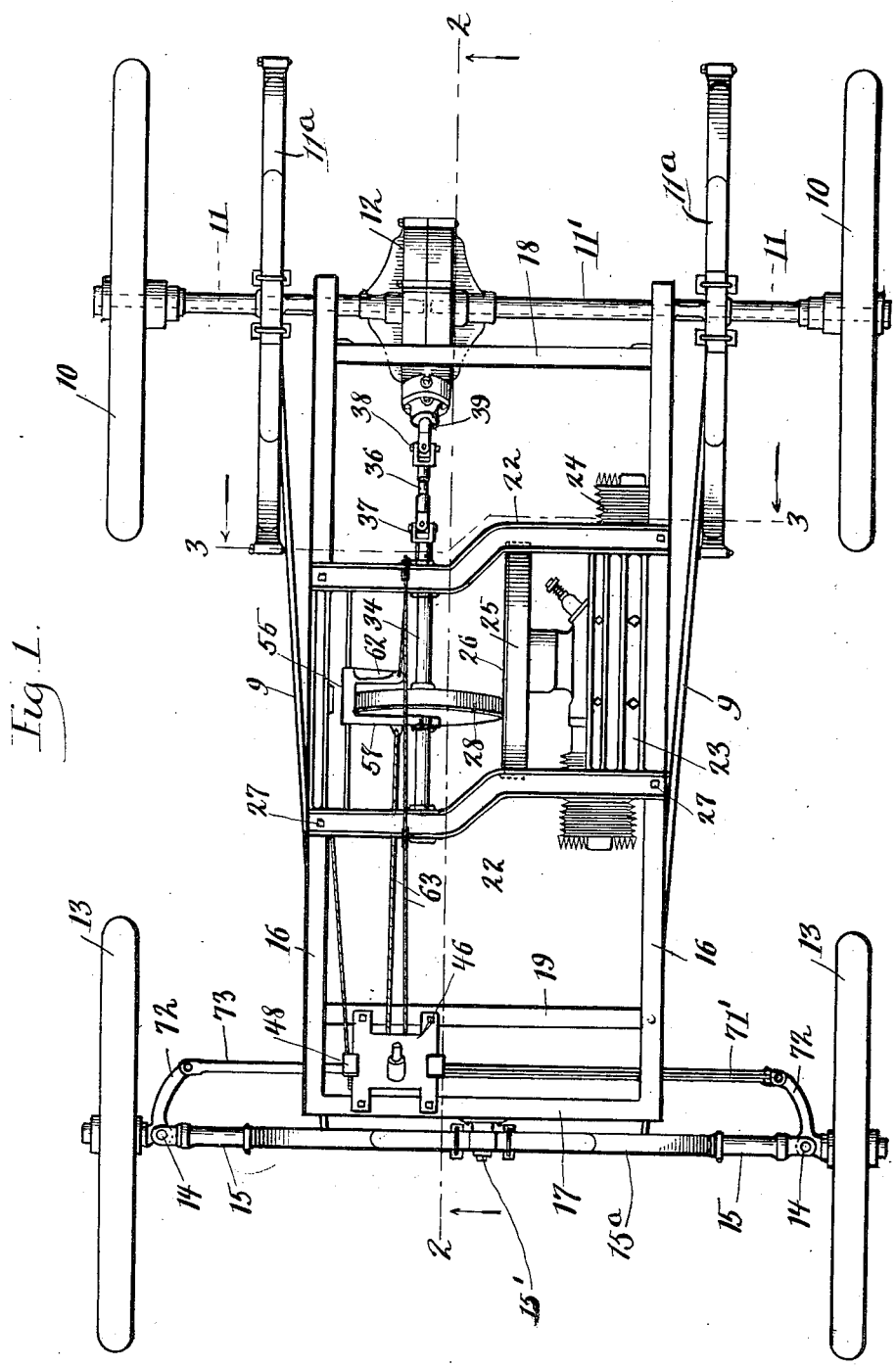

No. 872,881. PATENTED DEC. 3, 1907.
A. ZISKA, Jr.
DRIVE MECHANISM FOR MOTOR VEHICLES.
APPLICATION FILED NOV. 24, 1906.

4 SHEETS—SHEET 1.

Witnesses:
Wm. P. Bond
Lene S. Russell

Inventor:
Adam Ziska Jr.
By Fred Gerlach
his Attorney.

No. 872,881. PATENTED DEC. 3, 1907.
A. ZISKA, Jr.
DRIVE MECHANISM FOR MOTOR VEHICLES.
APPLICATION FILED NOV. 24, 1906.
4 SHEETS—SHEET 2.
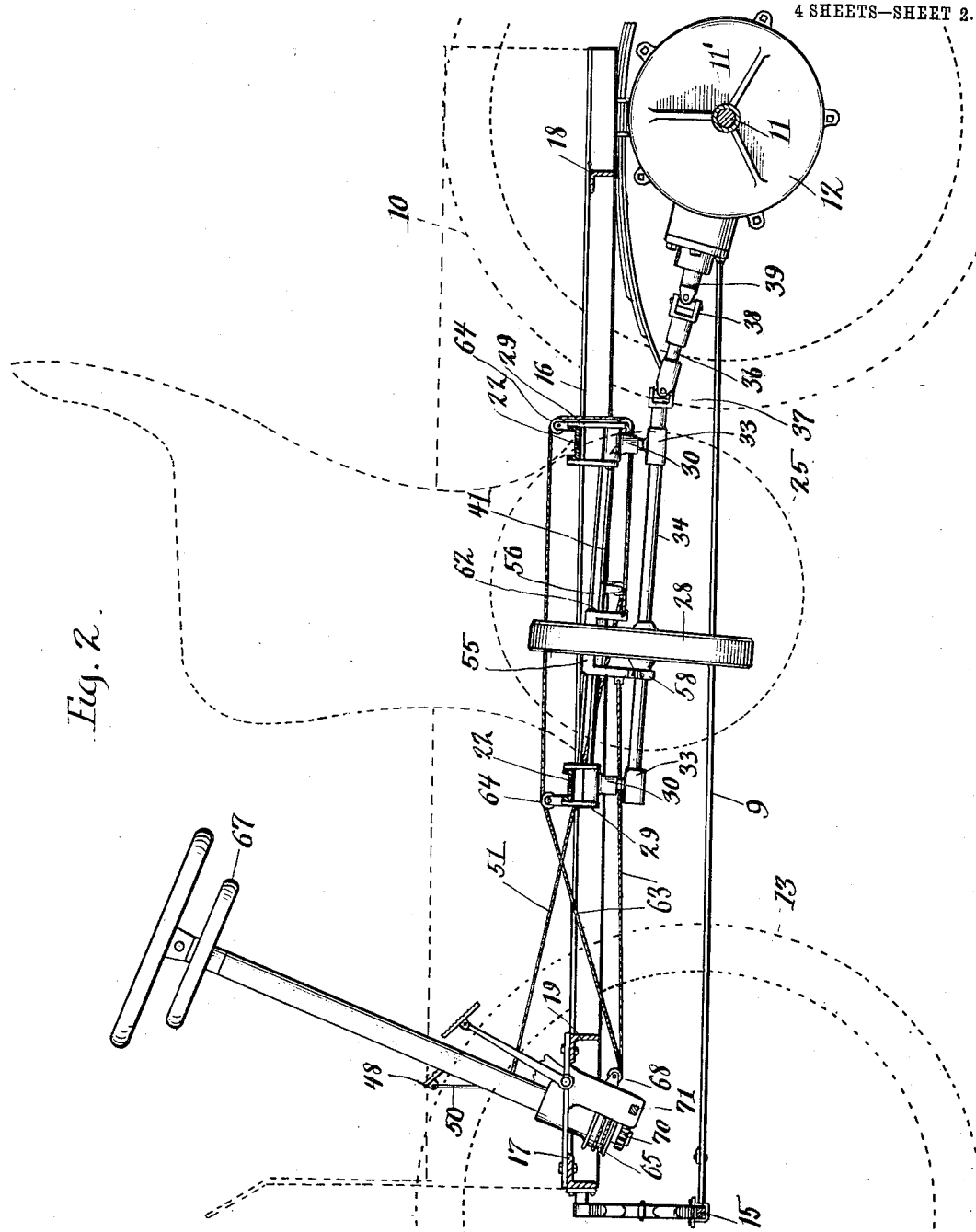

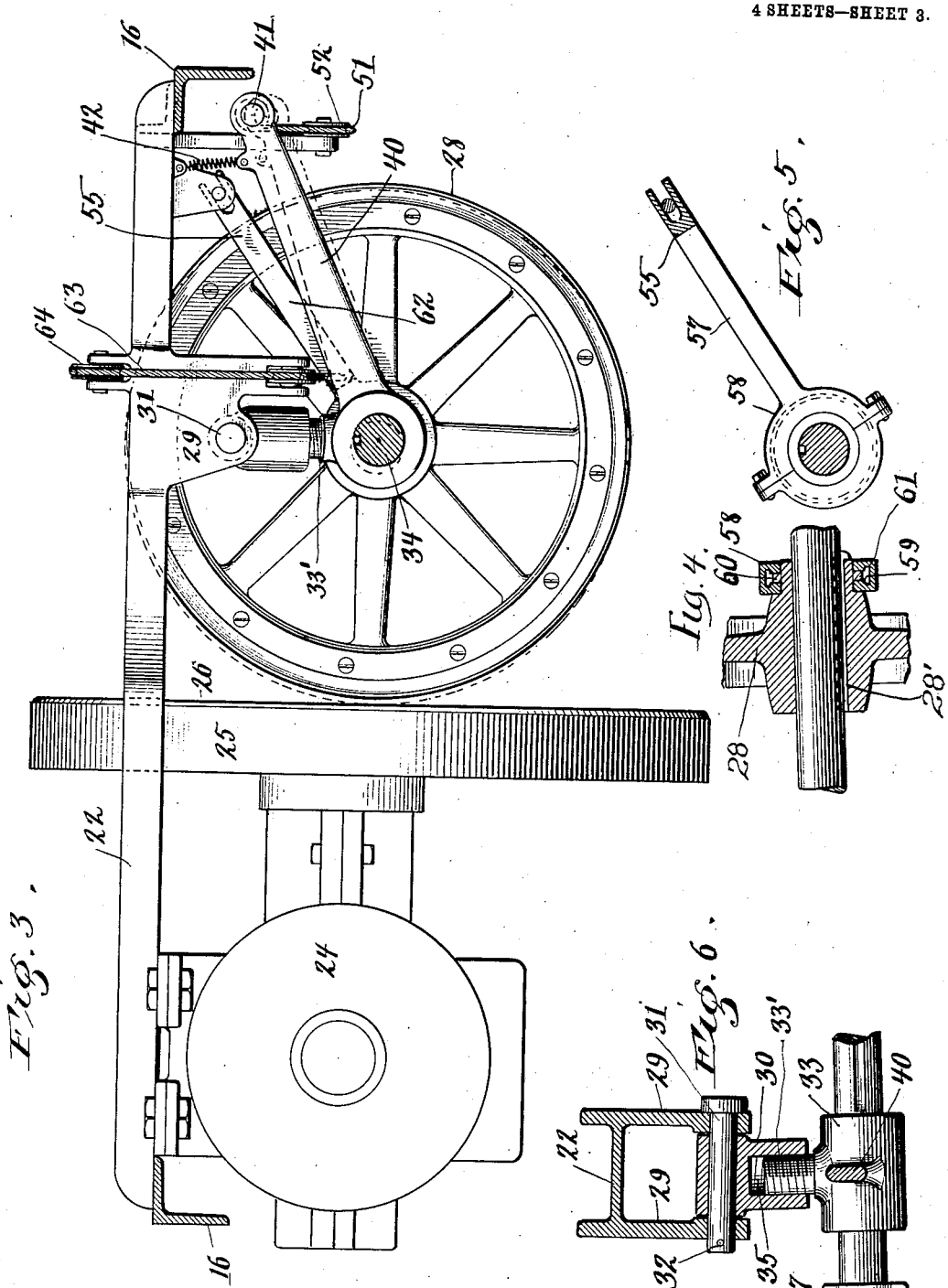

No. 872,881.
PATENTED DEC. 3, 1907.
A. ZISKA, Jr.
DRIVE MECHANISM FOR MOTOR VEHICLES.
APPLICATION FILED NOV. 24, 1906.
4 SHEETS—SHEET 4.
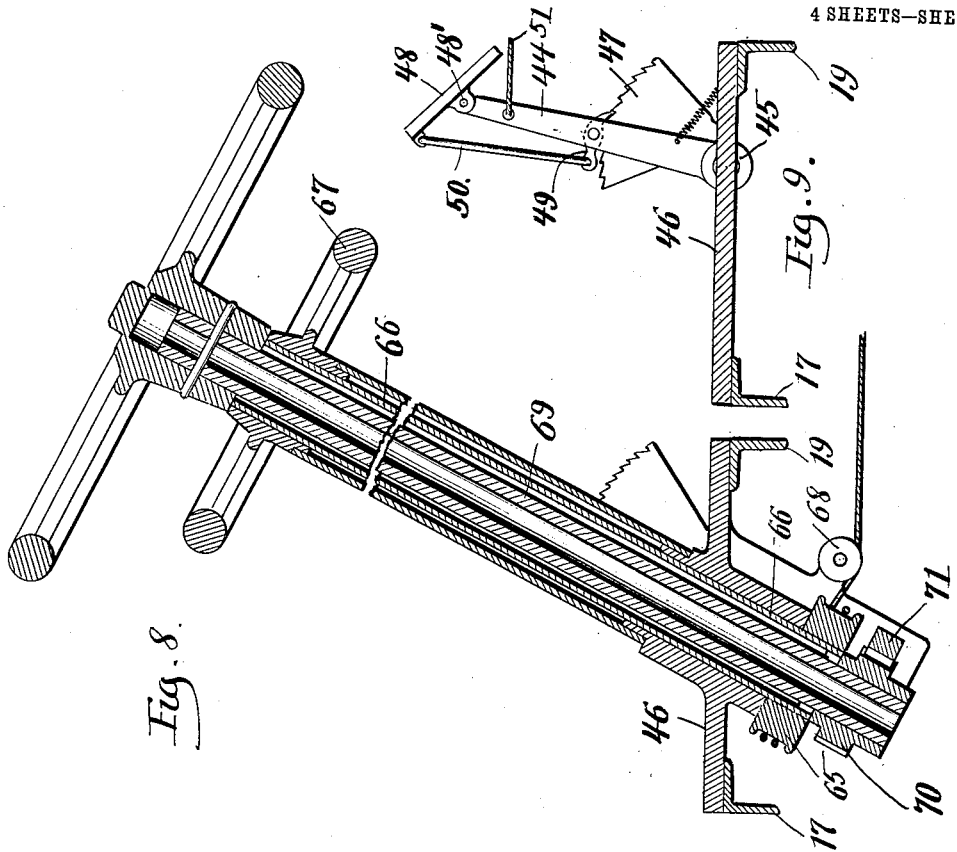
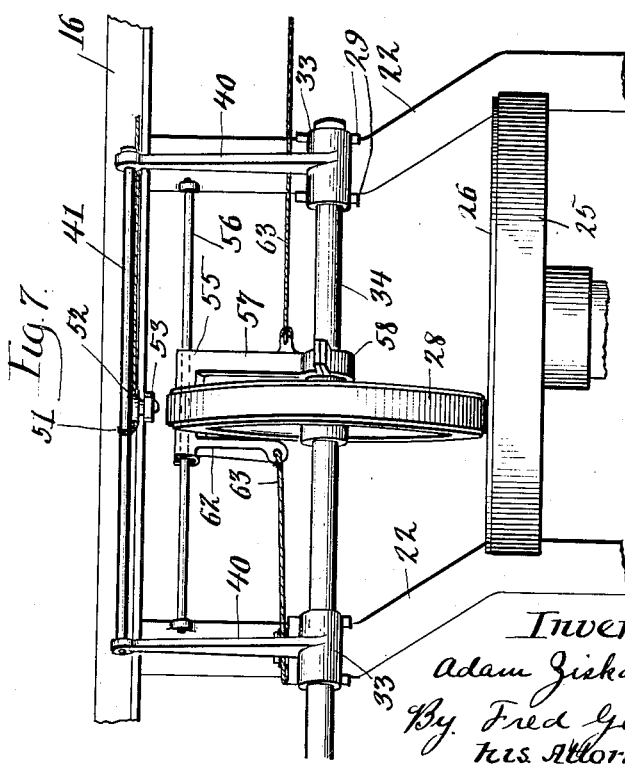

UNITED STATES PATENT OFFICE.

ADAM ZISKA, JR., OF CHICAGO, ILLINOIS, ASSIGNOR TO ROCKFORD AUTOMOBILE & ENGINE CO., OF ROCKFORD, ILLINOIS.

DRIVE MECHANISM FOR MOTOR-VEHICLES.

No. 872,881.      Specification of Letters Patent.      Patented Dec. 3, 1907.

Application filed November 24, 1906. Serial No. 344,936.

*To all whom it may concern:*

Be it known that I, ADAM ZISKA, Jr., a resident of Chicago, in the county of Cook and State of Illinois, have invented certain new and useful Improvements in Drive Mechanism for Motor-Vehicles, of which the following is a full, clear, and exact description.

The invention relates to motor-vehicles and more particularly to variable speed driving-mechanism therefor and to the controlling devices for said mechanism.

The invention designs to provide an improved variable speed driving-mechanism for motor-vehicles which is simple in construction.

A further object of the invention is to provide a friction driving-mechanism which permits relative adjustment of the friction wheels, one with respect to the other to bring them in such relation that when they are engaged the tendency of the driven wheel to creep across the face of the driver is overcome.

The invention further designs to provide a simple shifting-device for the friction pulley whereby it can be readily and conveniently adjusted and shifted into or out of engagement with the driver.

Still another object of the invention is to provide a driving-mechanism which avoids the necessity of employing a shaft having telescopic or slidably connected sections usually necessary when the motor is suspended from a spring-supported frame. The invention further designs to improve the construction of the controlling-devices for the driving-mechanism.

The invention consists in the several novel features hereinafter set forth and more particularly defined by claim at the conclusion hereof.

In the drawings: Figure 1 is a plan of a motor-vehicle embodying the invention, the vehicle body being omitted. Fig. 2 is a section on a somewhat larger scale taken on line 2—2 of Fig. 1. Fig. 3 is an enlarged section on line 3—3 of Fig. 1. Fig. 4 is a section through the shifter-yoke and a portion of the friction-pulley. Fig. 5 is a detail of the shifter-yoke. Fig. 6 is a vertical section of the journal support for the drive-shaft. Fig. 7 is an inverted plan of the friction driving-mechanism. Fig. 8 is a vertical section through the steering post and speed-controller mechanism, and Fig. 9 is a detail of the treadle for controlling the operation of the driving-mechanism.

The vehicle usually comprises traction-wheels, 10 operatively connected to a divided shaft 11, the sections of which are connected to a differential gear in a case 12. The shaft is usually journaled in a hollow axle 11'. The usual dirigible wheels 13 are provided at the front of the vehicle, each being pivotally connected as at 14 to a front axle 15 which has a vertically swiveling connection 15' with the frame. All of said parts may be of usual construction, well understood in the art. Reaches or retaining rods 9 usually connect the front and rear axles.

A supporting-frame usually of angle-iron and comprising sides 16, a front rail 17, a rear-rail 18 and a cross-bar 19, all rigidly secured together, is yieldingly supported by springs 11ª, 15ª connected to the carrying-wheels.

A supplemental frame comprises transversely extending bars 22 and a longitudinally extending web or plate 23 to which an explosive-engine 24 is secured. The supplemental frame is bolted as at 27 to the side rails of the main frame. This motor or engine may be of any suitable construction or type and drives a fly-wheel 25 which has on its outer face a friction-plate 26 preferably of aluminium which provides a suitable friction surface for driving a pulley.

The bars 22 of the supplemental frame have portions at one side relatively off-set with respect to those at the other side and between said arms is supported an adjustable friction-driven pulley 28 which is mounted on a drive-shaft 34 whereby the pulley may be shifted to and from the driving-face of the fly-wheel of the motor and is movable longitudinally on the shaft across the face of the drive-wheel so as to be driven at different relative speeds or in opposite directions by a spline 28' fitting in a groove in the shaft. Each supplemental frame-bar 22 is formed with depending lugs or brackets 29 and in said brackets, hangers 30 for the drive-shaft 34 are suspended. Each hanger is removably connected to its bracket by a removable pin 31, the hanger fitting between lugs 29 and being secured against turning thereby. Pin 31 extends through the lugs 29 and through the hanger and is held in position by a pin 32 which can be removed so that the pin can be withdrawn. Journals 33 for the drive-shaft 34 (see Fig. 6) are each adjustably connected to one of the hangers by a screw-thread on an upwardly extending stud 33' on the journal, adapted to engage a correspondingly threaded socket 35 in the hanger.

The drive-shaft can be adjusted at either or both ends by adjustment of its journals. By removing pins 32 and 31, the hangers can be withdrawn from lugs 29' and turned to bring the journal to or from the suspension-point or pivot of the hanger. The adjustment of the shaft is in a plane substantially parallel to the friction-face of the driver and by adjustment of the journal at one or the other end of the shaft, the pulley can be adjusted to vary the line of engagement of the periphery of the pulley on the face of the driver. If desired, both ends may be adjusted.

In practice it has been found that there usually is a tendency of the pulley, unless it is properly adjusted, to creep along the shaft as it is operated by the driver. It is preferable to avoid the employment of a locking-device for the speed-controlling device, and therefore it is important to provide a non-creeping adjustable pulley which avoids a change of speed, in a self-retained controlling-device and when the device is left unsecured. In practice it has been found that by adjusting the pulley shaft to vary the line of engagement of the periphery of the pulley with the face of the drive-wheel, so the line of engagement will be slightly tangential rather than radial, any tendency of the pulley to creep or move longitudinally along the shaft can be positively overcome, in all instances. This adjustment is also important because the pulley-shaft which is movable to and from the face of the drive-wheel, can be alined to a nicety to cause the periphery of the pulley to engage the face of the wheel in desired line with respect to the axis of the driver. The independently adjustable journals make it possible to adjust the shaft to any position desired to overcome any tendency of the pulley to creep on the shaft, and according to the direction of travel of the driver, or to compensate for any slight variation in the pulley or its adjustable journals or hangers.

Drive-shaft 34 is extended rearwardly of its journals and is connected to the differential driving gear in case 12. A short shaft 36 is connected at its front end to shaft 34 by a universal joint 37 and by a universal joint 38 to a shaft 39 which is journaled in gear case 12 and geared to the differential gear-mechanism. One object of the invention is to avoid the necessity of providing a telescopic drive-shaft to allow for relative movement of the frame and the differential gear, resulting from the springs or cushions between the carrying-wheels and the supporting-frame on which the driving-mechanism is mounted. Shaft 34 is free to slide in its journals 33 and through pulley 28 which is held against longitudinal movement by mechanism hereinafter referred to. By providing a shaft 34, which is adapted to slide in its bearings and through the drive-wheel, the necessity of providing a telescopic universal shaft formed of telescopically connected sections is avoided. When the supporting frame is moved toward the axle of the traction-wheels e. g. in traveling over an obstruction, universal joints 37 and 38 will permit the shaft 36 to swing about joint 38 while shaft 34 will slide in its journals and through pulley 28 to allow for any longitudinal displacement of shaft 34 as shaft 36 swings or yields in response to the relative movement of the frame and the carrying-wheels.

An arm 40 is integrally formed with each of the journals 33 for the drive-shaft 34 and the outer ends of these arms are cross-connected by a rod 41, and thus the journals, hangers 30 and said arms form levers which are cross-connected on a pivotally suspended frame for shifting pulley 28 into and holding it in engagement with the face of the drive-wheel. Springs 42 connected to the frame and to the arms 40 near their outer ends hold the pulley and drive-shaft 34 normally in inoperative position and the periphery of the wheel away from the driving face of the fly-wheel and shift the pulley into such position upon release of the pulley.

The controlling-device for shifting the pulley into operative relation with the drive-wheel comprises a treadle arm 44 pivotally connected as at 45 to a bracket 46 which is secured to the main frame and in which the speed controlling device and the steering device are also mounted. A rack 47 is rigidly secured to the bracket and a treadle 48 is pivotally connected to the treadle-arm 44. A latch 49 is connected to the treadle by a link 50. The treadle-arm can be shifted forwardly about its pivot 45 by the treadle and when tilted about its pivot 48', it will release the dog 49 so that the treadle and arm 44 can be moved rearwardly by springs 42 and a flexible connection such as a cable 51 which is connected to the treadle-arm and extended around a sheave 52 connected to a lug 53 which is secured to one of the side-bars of the frame. The cable 51 is connected to the cross-bar 41 of the pulley shifting-mechanism, and secured to the medial portion of the cross-bar to equalizedly operate both of its arms secured to drive-shaft journals. By pushing the treadle 48 forwardly the flexible connector 51 will pull the cross-rod 41 downwardly, causing the drive-shaft 34 and drive pulley 28 to swing forwardly about fulcra 31 to bring the periphery of the pulley in engagement with the face of driver 25. The latch 49 will hold the treadle-arm and connection so the pulley will be held in operative position. To disconnect the pulley it is only necessary to tilt the treadle 48 about its pivot 48' thus causing dog 49 to be released from rack 47 whereupon springs 42 will quickly retract the drive-pulley 28 to inoperative position and also shift the connections correspondingly. Universal joints 37 and 38 and shaft 36 permit the pulley-shaft and pulley to be shifted bodily without straining the parts.

The speed-controlling and reversing mechanism for shifting the drive-pulley 28 to or from the axis of rotation of the drive-wheel comprises a yoke 55 having its outer end guided vertically by a transverse rod 56 which extends loosely through the forked end of the yoke and supports the yoke so it can be shifted laterally to correspondingly shift the drive-wheel. One arm 57 of the yoke is provided with a sectional collar 58 in which is formed a groove 59 for a collar 60 secured to and revolving with the pulley 28. The collar 60 of the yoke is also provided with an annular recess or lubricant-pocket 61, for containing lubricant for the rotative connection between the yoke and the shaft. This yoke serves to shift the drive-wheel longitudinally on the drive-shaft 34 in either direction, and to move it inwardly or outwardly to vary the relatve speed of the pulley with respect to the driver, and also to shift the pulley to the opposite side of the axis to effect reverse rotation of the pulley.

The collar-connection 58 and 59 between the drive-shaft and the yoke, makes it possible for the yoke to shift the drive-wheel while the wheel is in motion and serves also to hold it in assigned position on the shaft to maintain the speed desired. The outer end of the yoke is free to slide on rod 56. The loose connection between the yoke and rod 56 permits the drive-shaft to be shifted to throw the pulley into and out of engagement with the drive-wheel. The position of the yoke determines the speed of the drive-shaft and the direction of travel thereof, and the yoke is controlled by a flexible connection such as a cable 63, one end of which is secured to a short arm 62 of the yoke, and the other end is connected to the arm 57 of the yoke. The intermediate portion of the cable is trained around and secured to a drum 65 which is secured to a hollow-shaft 66 mounted in bracket 46. A controller wheel or lever 67 is secured to said shaft. When the drum is turned by hand-wheel 67 one end of the cable will be drawn around the drum 65 and the other will be paid out. Sheaves 68 mounted in bracket 46 and sheaves 64 sustained by lugs on the frame 22 guide the cable to the periphery of the drum 65 and to the yoke. In operation, when it is desired to vary the speed of the vehicle, it is only necessary to turn the speed-controller wheel 67 which will turn the drum 65 and cause one end of the flexible connection 63 to shift yoke 55 and drive-wheel longitudinally along the drive-shaft into the desired position. This flexible connection permits the drive-wheel to be thrown into and out of operative position without straining the parts thereof, and furthermore permits the inclination of the shaft to be adjusted when desired to overcome the tendency of the pulley to "creep" on the shaft as hereinbefore set forth.

A steering-shaft 69 extends through the hollow-shaft for the speed-controller and has secured to its lower end a pinion 70 for operating a rack 71 which is connected by a link 71' to one of the arms 72 whereby the position of the dirigible wheels is controlled. A cross-connector 73 connects the arms 72 of the dirigible wheels to effect their conjoint shift in the same direction.

Manifestly the invention provides an improved variable speed driving-mechanism which is simple in construction and simple speed-changing, reversing and controlling devices.

The invention is not to be understood as restricted to the details set forth since these may be modified without departing from the spirit and scope of the invention.

Having thus described the invention, what I claim as new and desire to secure by Letters Patent, is:

1. In a motor-vehicle, the combination of a motor-operated drive-wheel having a friction face, a pulley having a peripheral friction surface, a shaft on which the pulley is mounted operatively connected to the pulley, means for adjusting the shaft to vary the line of engagement of the friction-surfaces of the drive-wheel and pulley and means for adjusting the pulley to engage the face of the drive-wheel at different points along said line to vary the speed of the pulley.

2. In a motor-vehicle, the combination of a motor-operated drive-wheel having a friction face, a pulley having a peripheral friction surface, a shaft on which the pulley is mounted operatively connected to the pulley, means for adjusting the shaft to vary the line of engagement of the friction-surfaces of the drive-wheel and pulley, and means for shifting the pulley into and out of operative relation with the drive-wheel.

3. In a motor-vehicle, the combination of a motor-operated drive-wheel having a friction face, a pulley having a peripheral friction surface, a shaft on which the pulley is mounted operatively connected to the pulley, means for adjusting the shaft to vary the line of engagement of the friction-surfaces of the drive-wheel and pulley, means for adjusting the pulley to engage the face of the drive-wheel at different points along said line to vary the speed of the pulley, and means for shifting the pulley into and out of engagement with the drive-wheel.

4. In a motor-vehicle, the combination of a motor-operated drive-wheel having a friction-face, a pulley having a peripheral friction-surface, a shaft on which the pulley is slidably mounted operatively connected to the pulley, means for adjusting the shaft to vary the line of engagement of the friction-surfaces of the drive-wheel and the pulley, and means for adjusting the pulley on said shaft to vary the point of engagement along the line of the shaft.

5. In a motor-vehicle, the combination with a motor-operated drive-wheel having a friction-face, a pulley having a peripheral friction-surface, a shaft on which the pulley is slidably mounted operatively connected to the pulley, journals in which the shaft is slidably mounted and means for adjusting the bearings to vary the position of the shaft so the line of contact of the friction-surfaces of the pulley and drive-wheel may be varied.

6. In a motor-vehicle, the combination of a motor-operated drive-wheel having a friction-face, a pulley having a peripheral friction-surface, a shaft operatively connected to the pulley and on which the pulley is slidably mounted so as to be shiftable across the face of the drive-wheel, journals in which the shaft is mounted, means for shifting the journals to cause the pulley to be brought into and out of engagement with the drive-wheel, and means for adjusting the journals to vary the line of engagement of the friction-surfaces.

7. In a motor-vehicle, the combination of a motor-operated drive-wheel having a friction-face, a pulley having a peripheral friction-surface, a shaft operatively connected to the pulley and on which the pulley is slidably mounted so as to be shiftable across the face of the drive-wheel, journals in which the shaft is slidably mounted, means for shifting the journals to cause the pulley to be brought into and out of engagement with the drive-wheel, and means for adjusting the journals to vary the line of engagement of the friction-surfaces.

8. In a motor-vehicle, the combination of a motor-operated drive-wheel having a friction-face, a pulley having a peripheral friction-surface, a shaft on which the pulley is slidably mounted operatively connected to the pulley, independently adjustable journals in which the shaft is mounted for adjusting the shaft to vary the line of engagement of the contacting friction-surfaces of the drive-wheel and pulley, and means for shifting the journals to bring the pulley into engagement with the drive-wheel.

9. In a motor-vehicle, the combination of a motor-operated drive-wheel having a friction-face, a pulley having a peripheral friction-surface, a shaft on which the pulley is slidably mounted operatively connected to the pulley, independently adjustable journals in which the shaft is slidably mounted for adjusting the shaft to vary the line of engagement of the contacting friction-surfaces of the drive-wheel and pulley, and means for shifting the journals to bring the pulley into engagement with the drive-wheel.

10. In a motor-vehicle, the combination of a motor-operated drive-wheel having a friction-face, a pulley having a peripheral friction-surface, a shaft on which the pulley is slidably mounted and to which it is operatively connected, journals for said shaft, pivoted-supports for the journals and screw-threaded connections between the supports and the journals for adjusting the shaft to vary the line of engagement of the friction-surfaces of the drive-wheel and the pulley.

11. In a motor-vehicle, the combination of a motor-operated drive-wheel having a friction-face, a pulley having a peripheral friction-surface, a shaft on which the pulley is slidably mounted and to which it is operatively connected, journals for said shaft, pivoted-hangers, threaded connections between the hangers and the journals for adjusting the shaft to vary the line of engagement of the friction-surfaces of the drive-wheel and pulley, and means for shifting the journals to bring the pulley into engagement with the drive-wheel.

12. In a motor-vehicle, the combination of a motor-operated drive-wheel having a friction-face, a pulley having a peripheral friction-surface, a shaft on which the pulley is slidably mounted and to which it is operatively connected, journals for said shaft, pivoted supports for said journals, arms for shifting the journals about the support-pivots, adjustable connections between the supports and the journals, and means for operating the arms to swing the pulley into engagement with the drive-wheel.

13. In a motor-vehicle, the combination of a motor operated drive-wheel having a friction-face, a pulley having a peripheral friction-surface, a shaft on which the pulley is slidably mounted and to which it is operatively connected, journals for said shaft, pivotally sustained hangers or supports for said journals, arms for shifting said journals, a cross-bar connected to said arms, and means for shifting the cross-bar to swing the journals about the support pivots and to bring the pulley into engagement with the drive-wheel, said means comprising a flexible connection for operating the cross-bar.

14. In a motor-vehicle, the combination of a motor-operated drive-wheel having a friction-face, a pulley having a peripheral friction-surface, a shaft on which the pulley is slidably mounted and to which it is operatively connected, adjustable pivotally sustained journals for said shaft, arms for shifting said journals, and means for yieldingly holding the friction-wheel out of engagement with the drive-wheel.

15. In a motor-vehicle, the combination of a motor-operated drive-wheel having a friction-face, a pulley having a peripheral friction-surface, a shaft on which the pulley is slidably mounted, movable journals in which said shaft is mounted, means for shifting the pulley into and out of engagement with the drive-wheel, and means for shifting the pulley longitudinally on the shaft, comprising a yoke provided with a collar which is connected to the pulley to shift it in either direction longitudinally, said collar having a groove therein for retaining lubricant for the connection between the collar and the pulley.

16. In a motor-vehicle, the combination of a motor-operated drive-wheel having a friction-face, a pulley having a peripheral friction-surface, a shaft on which the pulley is slidably mounted and to which it is operatively connected, movable journals for said shaft, and means for sliding the pulley on the shaft comprising a yoke connected to the pulley, a flexible connection connected to the yoke and for shifting it in either direction, a drum to which said flexible connection is connected, a steering shaft, a hollow shaft around the steering shaft and to which said drum is secured, and means for turning said shaft.

17. In a motor-vehicle, the combination of a drive-wheel having a friction-face, a pulley having a peripheral friction-surface, a shaft on which the pulley is slidably mounted, journals in which the pulley-shaft is slidably mounted, and a connection for driving the traction-wheels from said shaft, comprising a non-extensible shaft and a universal joint at each end respectively connected to the pulley shaft and the traction-wheels.

18. In a motor-vehicle, the combination of a drive-wheel having a friction-face, a pulley having a peripheral friction-surface, a shaft on which the pulley is slidably mounted, movable journals in which the pulley shaft is slidably mounted, and a connection for driving the traction-wheels from said shaft, comprising a non-extensible shaft and a universal joint at each end respectively connected to the pulley-shaft and the traction wheels.

19. In a motor-vehicle, the combination of a drive-wheel having a friction-face, a pulley having a peripheral friction-surface, a shaft on which the pulley is slidably mounted, movable and adjustable journals in which the pulley-shaft is slidably mounted, and a connection for driving the traction-wheels from said shaft, comprising a non-extensible shaft and a universal joint at each end respectively connected to the pulley-shaft and the traction-wheels.

20. In a motor-vehicle, the combination of a drive-wheel having a friction-face, a pulley having a peripheral friction-surface, a shaft on which the pulley is slidably mounted, pivotally sustained journals in which the pulley-shaft is slidably mounted, and a connection for driving the traction-wheels from said shaft, comprising a non-extensible shaft and a universal joint at each end respectively connected to the pulley shaft and the traction-wheels.

21. In a motor-vehicle, the combination of a drive-wheel having a friction-face, a pulley having a peripheral friction-surface, a shaft on which the pulley is slidably mounted, adjustable pivotally sustained journals in which the pulley-shaft is slidably mounted, and a connection for driving the traction-wheels from said shaft, comprising a non-extensible shaft and a universal joint at each end respectively connected to the pulley-shaft and the traction-wheels.

ADAM ZISKA, Jr.

Witnesses:
FRED GERLACH.
JOHN F. WATERS.